US012568286B2

(12) United States Patent
Zhu et al.

(10) Patent No.: US 12,568,286 B2
(45) Date of Patent: Mar. 3, 2026

(54) METHOD FOR GENERATING LIVE-STREAMING DATA, STORAGE MEDIUM, AND ELECTRONIC DEVICE THEREOF

(71) Applicant: Guangzhou Boguan Telecommunication Technology Co., Ltd., Guangdong (CN)

(72) Inventors: Juncheng Zhu, Guangdong (CN); Yuxuan Zhuang, Guangdong (CN); Jing Sun, Guangdong (CN)

(73) Assignee: Guangzhou Boguan Telecommunication Technology Co., Ltd., Guangzhou (CN)

( * ) Notice: Subject to any disclaimer, the term of this patent is extended or adjusted under 35 U.S.C. 154(b) by 5 days.

(21) Appl. No.: 18/565,100

(22) PCT Filed: Jan. 26, 2022

(86) PCT No.: PCT/CN2022/074116
§ 371 (c)(1),
(2) Date: Nov. 29, 2023

(87) PCT Pub. No.: WO2022/257480
PCT Pub. Date: Dec. 15, 2022

(65) Prior Publication Data
US 2024/0267596 A1     Aug. 8, 2024

(30) Foreign Application Priority Data
Jun. 7, 2021     (CN) .......................... 202110632898.4

(51) Int. Cl.
| | |
|---|---|
| *H04N 21/81* | (2011.01) |
| *G06T 7/13* | (2017.01) |
| *H04N 21/2187* | (2011.01) |
| *H04N 21/234* | (2011.01) |

(52) U.S. Cl.
CPC ........... *H04N 21/8146* (2013.01); *G06T 7/13* (2017.01); *H04N 21/2187* (2013.01);
(Continued)

(58) Field of Classification Search
CPC ........... H04N 21/8146; H04N 21/2187; H04N 21/23412; H04N 21/23418;
(Continued)

(56) References Cited

U.S. PATENT DOCUMENTS

| | | |
|---|---|---|
| 10,176,636 B1 | 1/2019 | Neustein et al. |
| 2011/0069866 A1 | 3/2011 | Kim et al. |
| (Continued) | | |

FOREIGN PATENT DOCUMENTS

| | | | |
|---|---|---|---|
| CN | 104717567 A | * | 6/2015 |
| CN | 107277481 A | | 10/2017 |
| (Continued) | | | |

OTHER PUBLICATIONS

English Translation of CN104717567A (Year: 2015).*
(Continued)

*Primary Examiner* — Kyu Chae
(74) *Attorney, Agent, or Firm* — Qinghong Xu

(57) ABSTRACT a method and an apparatus for generating live-streaming data, a computer-readable storage medium and an electronic device thereof are provided. The method includes: acquiring current contour information of a live-streaming object by using a thermal imaging device; generating target special effect data by binding preset special effect data with the current contour information of the live-streaming object; synthesizing a real-scene shooting image of the live-streaming object with the target special effect data into a special effect frame image; and converting the special effect frame image into live-streaming stream data.

17 Claims, 6 Drawing Sheets extracting a key feature point in a standard contour model ⟋ S610 determining a first binding position corresponding to the key feature point in the current contour information of the live-streaming object ⟋ S620 obtaining the target special effect data by binding the preset special effect data with the current contour information of the live-streaming object at the first binding position ⟋ S630

(52) U.S. Cl.
 CPC . *H04N 21/23412* (2013.01); *H04N 21/23418*
  (2013.01); *H04N 21/23424* (2013.01); *G06T*
   *2207/10016* (2013.01); *G06T 2207/10048*
    (2013.01)

(58) Field of Classification Search
 CPC ......... H04N 21/23424; H04N 21/2343; H04N
      21/44012; H04N 21/4402; H04N
     21/44213; G06T 7/13; G06T 2207/10016;
       G06T 2207/10048; G06T 5/50
 See application file for complete search history.

(56) References Cited

U.S. PATENT DOCUMENTS

| | | | |
|---|---|---|---|
| 2011/0069888 | A1 | 3/2011 | Lim et al. |
| 2014/0281014 | A1* | 9/2014 | Good .................. H04N 21/845 |
| | | | 709/231 |
| 2021/0158021 | A1 | 5/2021 | Wu et al. |
| 2022/0313095 | A1* | 10/2022 | Lichtensztein ...... A61B 5/0017 |

FOREIGN PATENT DOCUMENTS

| | | |
|---|---|---|
| CN | 109348277 A | 2/2019 |
| CN | 109474850 A | 3/2019 |
| CN | 109618183 A | 4/2019 |
| CN | 109963163 A | 7/2019 |
| CN | 110418155 A | 11/2019 |
| CN | 110475150 A | 11/2019 |
| CN | 110490828 A | 11/2019 |
| CN | 110536151 A | 12/2019 |
| CN | 110557649 A | 12/2019 |
| CN | 111935491 A | 11/2020 |
| CN | 112040263 A | 12/2020 |
| CN | 112085025 A | 12/2020 |
| CN | 112804578 A | 5/2021 |
| CN | 112860061 A | 5/2021 |
| CN | 113382275 A | 9/2021 |
| EP | 2763116 A1 | 8/2014 |
| JP | 2019009754 A | 1/2019 |

OTHER PUBLICATIONS

International Search Report dated Apr. 13, 2022 of International Application No. PCT/CN2022/074116.
1st Office Action dated Jan. 27, 2022 of Chinese Application No. 202110632898.4.
Notice of Allowance dated Dec. 26, 2022 of Chinese Application No. 202110632898.4.

* cited by examiner

<u>100</u>

<u>200</u>

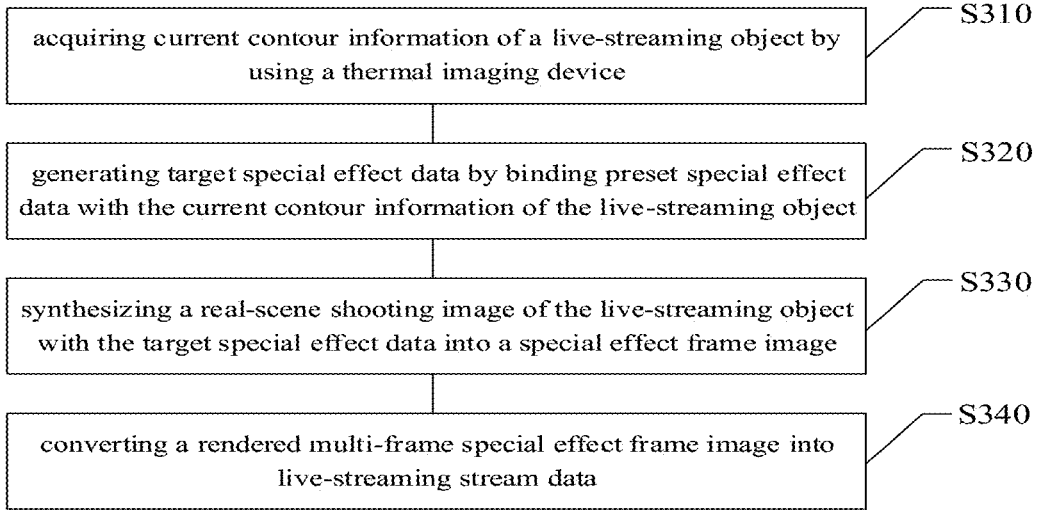

acquiring current contour information of a live-streaming object by using a thermal imaging device —— S310 generating target special effect data by binding preset special effect data with the current contour information of the live-streaming object —— S320 synthesizing a real-scene shooting image of the live-streaming object with the target special effect data into a special effect frame image —— S330 converting a rendered multi-frame special effect frame image into live-streaming stream data —— S340

FIG. 3

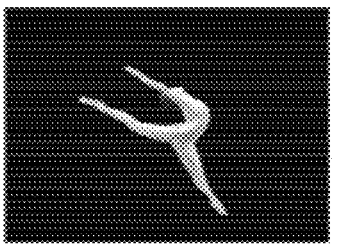

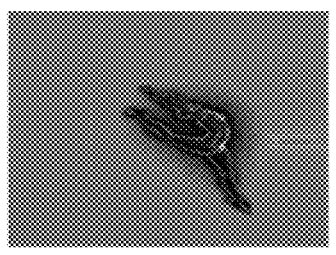

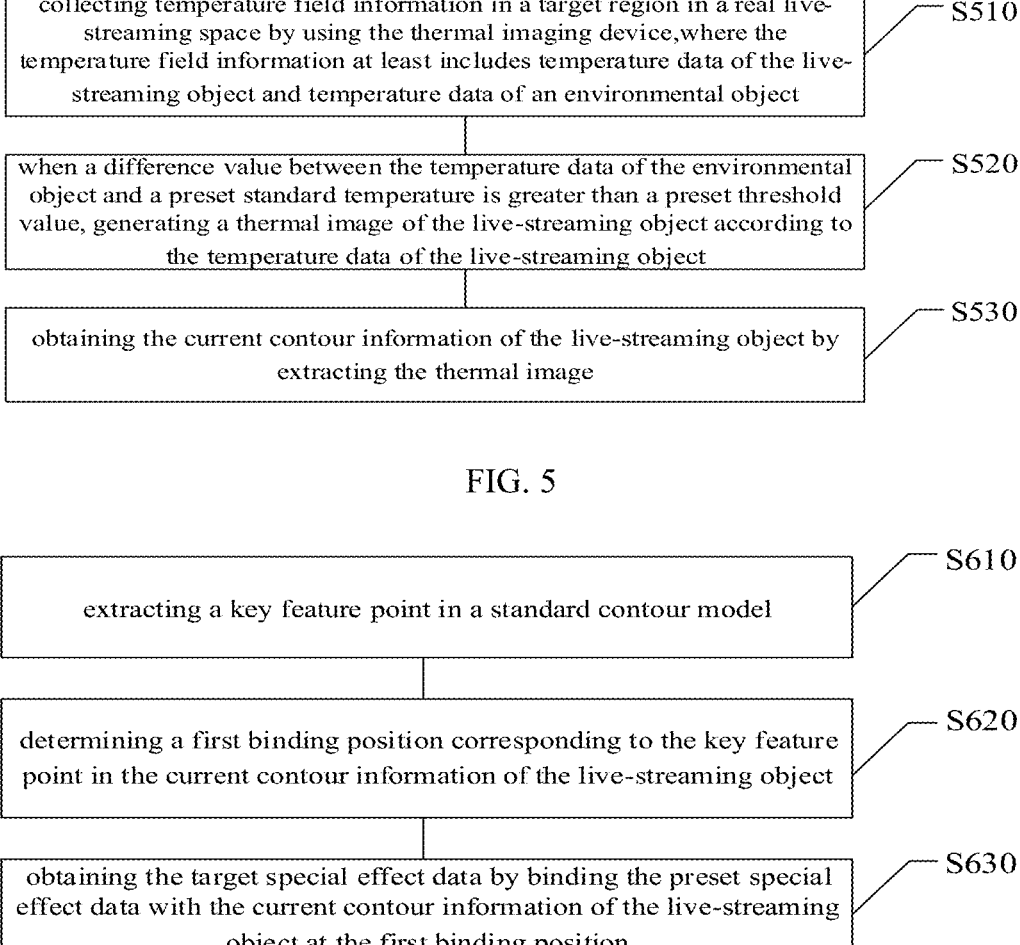

collecting temperature field information in a target region in a real live-streaming space by using the thermal imaging device,where the temperature field information at least includes temperature data of the live-streaming object and temperature data of an environmental object ⟋ S510 when a difference value between the temperature data of the environmental object and a preset standard temperature is greater than a preset threshold value, generating a thermal image of the live-streaming object according to the temperature data of the live-streaming object ⟋ S520 obtaining the current contour information of the live-streaming object by extracting the thermal image ⟋ S530

FIG. 5 extracting a key feature point in a standard contour model ⟋ S610 determining a first binding position corresponding to the key feature point in the current contour information of the live-streaming object ⟋ S620 obtaining the target special effect data by binding the preset special effect data with the current contour information of the live-streaming object at the first binding position ⟋ S630

METHOD FOR GENERATING LIVE-STREAMING DATA, STORAGE MEDIUM, AND ELECTRONIC DEVICE THEREOF

CROSS-REFERENCE

The present disclosure is the U.S. National Phase Application of PCT International Application No. PCT/CN2022/074116, filed on Jan. 26, 2022, which is based on and claims priority to Chinese Patent Application No. 202110632898.4, entitled "LIVESTREAMING DATA GENERATION METHOD AND APPARATUS, STORAGE MEDIUM, AND ELECTRONIC DEVICE", filed on Jun. 7, 2021, the entire content of both of which are incorporated herein by reference for all purposes.

TECHNICAL FIELD

The present disclosure relates to a field of computer technology, and more particularly, to a method for generating live-streaming data, an apparatus for generating live-streaming data, a computer-readable storage medium and an electronic device.

BACKGROUND

With the development of network technology; real-time video communication, such as an on-line live stream, has become an increasingly popular form of entertainment. In the process of the real-time video communication, how to enhance interaction with users is a topic of great concern.

For example, when an AR (Augmented Reality) technology is applied to the on-line live stream, it may enhance an overall effect of the live stream and improve user's live-streaming viewing experience. The AR technology superimposes physical information into a real world through simulation, so as to present a real environment and a virtual object on the same picture or space in real time. However, in the AR virtual live stream, the process of generating a live-streaming picture is relatively cumbersome, which cannot flexibly meet the requirement of the AR special effect synthesis in a large-scale live stream.

It should be noted that the above-mentioned information disclosed in the BACKGROUND section is only used to enhance the understanding of the background of the present disclosure, and therefore it may include information that does not constitute the information of the related art known to those skilled in the art.

SUMMARY

According to a first aspect of the present disclosure, a method for generating live-streaming data is provided and includes:

acquiring current contour information of a live-streaming object by using a thermal imaging device;

generating target special effect data by binding preset special effect data with the current contour information of the live-streaming object;

synthesizing a real-scene shooting image of the live-streaming object with the target special effect data into a special effect frame image; and converting a rendered multi-frame special effect frame image into live-streaming stream data.

According to a second aspect of the present disclosure, an electronic device is provided and includes: a processor, and a memory; configured to store executable instructions of the processor, where when performing the executable instructions, the processor is configured to execute the method according to any one of methods.

According to a third aspect of the present disclosure, a non-transitory computer-readable storage medium having a computer program stored thereon, where when performing the computer program, a processor is configured to implements the method according to any one of methods.

It should be understood that the above general description and the following detailed description are only exemplary and explanatory and should not limit the present disclosure.

BRIEF DESCRIPTION OF THE DRAWINGS

The drawings herein are incorporated into the specification and constitute a part of the specification, show embodiments that conform to the present disclosure, and are used together with the specification to explain the principles of the present disclosure. Obviously, the drawings in the following description are only some embodiments of the present disclosure. For those of ordinary skill in the art, without paying any creative work, other drawings may also be obtained based on these drawings.

FIG. 3 schematically shows a flowchart of a method for generating live-streaming data according to an embodiment of the present disclosure:

in FIG. 4, FIG. 4A schematically shows a real-scene shooting image of a live-streaming object according to an embodiment of the present disclosure: FIG. 4B schematically shows a contour image of a live-streaming object according to an embodiment of the present disclosure:

FIG. 5 schematically shows a flowchart for acquiring current contour information according to an embodiment of the present disclosure:

FIG. 6 schematically shows a flowchart for generating target special effect data according to an embodiment of the present disclosure:

DETAILED DESCRIPTION

Embodiments are now described more comprehensively with reference to the accompanying drawings. However, the embodiments may be implemented in various forms, and are not to be understood as being limited to the examples described herein. Instead, the embodiments are provided to make the present disclosure more thorough and complete and fully convey the idea of the embodiments to a person skilled in the art. The described features, structures, or characteristics may be combined in one or more embodiments in any appropriate manner. In the following description, many specific details are provided to give a full understanding of the embodiments of the present disclosure. However, it is to be appreciated by a person skilled in the art that one or more of the specific details may be omitted during practice of the technical solutions of the present disclosure, or other methods, components, apparatus, steps, or the like may be used. In other cases, well-known technical solutions are not shown or described in detail to avoid overwhelming the subject and thus obscuring various aspects of the present disclosure.

In addition, the accompanying drawings are merely exemplary illustrations of the present disclosure and are not necessarily drawn to scale. The same reference numbers in the accompanying drawings represent the same or similar parts, and therefore, repeated descriptions thereof are omitted. Some of the block diagrams shown in the accompanying drawings are functional entities and do not necessarily correspond to physically or logically independent entities. The functional entities may be implemented in the form of software, or implemented in one or more hardware modules or integrated circuits, or implemented in different networks and/or processor apparatuses and/or micro-controller apparatuses.

Figure 1:
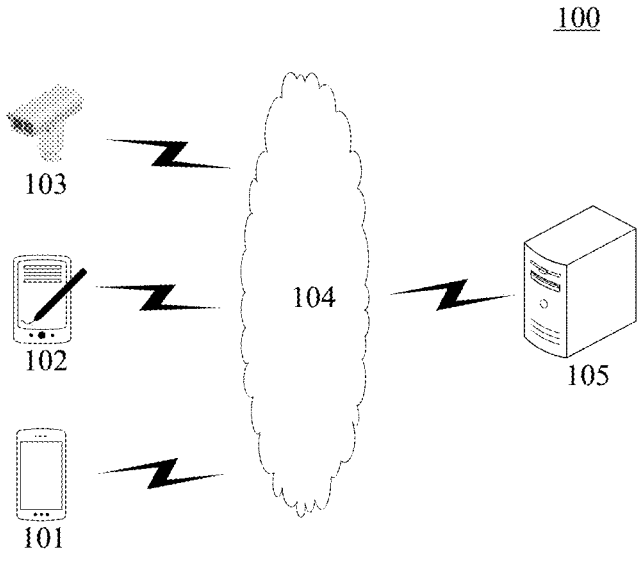
FIG. 1 shows a schematic diagram of a system architecture of an application environment to which a method and an apparatus for generating live-streaming data according to an embodiment of the present disclosure may be applied.

FIG. 1 shows a schematic diagram of a system architecture of an application environment to which a method and an apparatus for generating live-streaming data according to an embodiment of the present disclosure may be applied.

As shown in FIG. 1, a system architecture 100 may include one or a plurality of terminal devices 101, 102, and 103, a network 104, and a server 105. The network 104 is a medium configured to provide a communication link between the terminal devices 101, 102 and 103 and the server 105. For example, the network 104 may include various connection types such as wired and wireless communication links or fiber optic cables, and the like. The terminal devices 101, 102, and 103 may include various electronic devices including a fixed camera, a display screen, and a terminal processor, which includes but is not limited to, a smart phone, a video camera with a processing module and the like. The server 105 may be a backend server for providing backend services in the terminal devices 101, 102, 103. It should be understood that the quantities of terminal devices, networks, and servers in FIG. 1 are merely exemplary: There may be any quantities of terminal devices, networks, and servers according to an embodiment requirement. For example, the server 105 may be a server cluster that includes a plurality of servers.

The method for generating the live-streaming data provided in the embodiments of the present disclosure is generally performed by the server 105, and accordingly, the apparatus for generating the live-streaming data is generally disposed in the server 105. However, those skilled in the art should be readily understood that the method for generating the live-streaming data provided by the embodiments of the present disclosure may also be executed by terminal devices 101, 102 and 103, and accordingly; the apparatus for generating the live-streaming data may also be disposed in the terminal devices 101, 102 and 103, which is not specifically limited in the embodiment.

Figure 2:
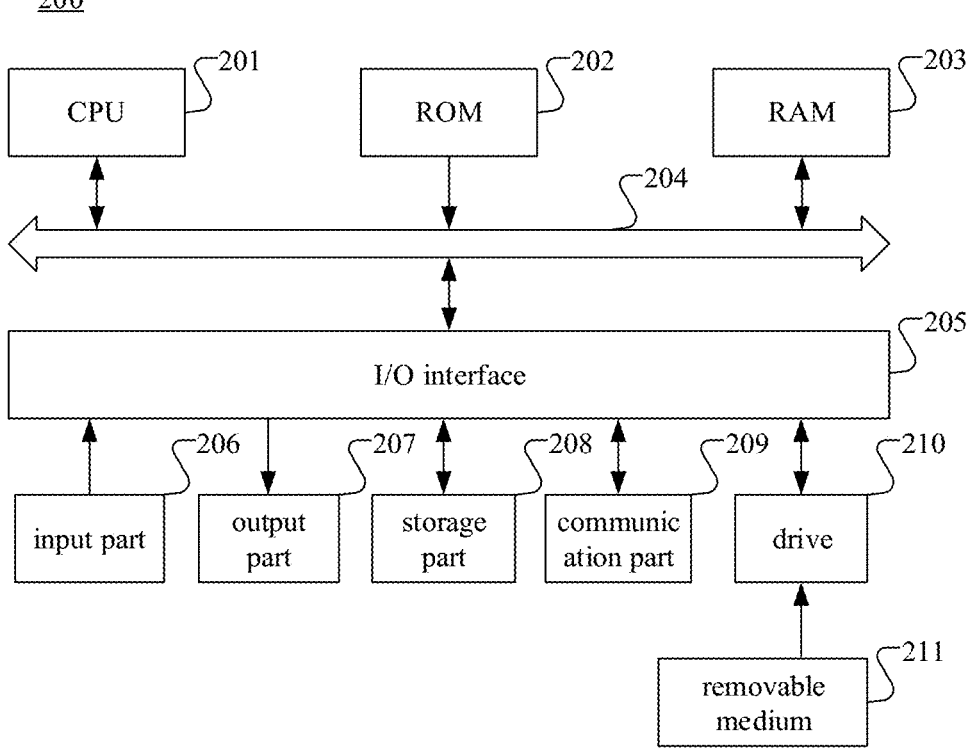
FIG. 2 shows a schematic structural diagram of a computer system adapted to implement an electronic device according to an embodiment of the present disclosure.

FIG. 2 shows a schematic structural diagram of a computer system adapted to implement an electronic device according to an embodiment of the present disclosure.

A computer system 200 of the electronic device shown in FIG. 2 is merely an example, and does not constitute any limitation on functions and use ranges of the embodiments of the present disclosure.

As shown in FIG. 2, the computer system 200 includes a central processing unit (CPU) 201, which may perform various proper actions and processing based on a program stored in a read-only memory (ROM) 202 or a program loaded from a storage part 208 into a random access memory (RAM) 203. The RAM 203 further stores various programs and data required for operating the system. The CPU 201, the ROM 202, and the RAM 203 are connected to each other through a bus 204. An input/output (I/O) interface 205 is also connected to the bus 204.

The following components are connected to the I/O interface 205: an input part 206 including a keyboard, a mouse, or the like: an output part 207 including a cathode ray tube (CRT), a liquid crystal display (LCD), a speaker, or the like: a storage part 208 including a hard disk or the like; and a communication part 209 of a network interface card, including a LAN card, a modem, or the like. The communication part 209 performs communication processing by using a network such as the Internet. A drive 210 is also connected to the I/O interface 205 as required. A removable medium 211, such as a disk, an optical disc, a magneto-optical disc, or a semiconductor memory, is installed on the drive 210 as required, so that a computer program read from the removable medium 211 is installed in the storage part 208 as required.

Particularly; according to an embodiment of the present disclosure, the processes described below by referring to the flowcharts may be implemented as computer software programs. For example, an embodiment of the present disclosure includes a computer program product. The computer program product includes a computer program stored in a computer-readable medium. The computer program includes a program code used for performing a method shown in the flowchart. In such an embodiment, the computer program may be downloaded and installed through the communication part 209 from a network, and/or installed from the removable medium 211. When the computer program is executed by the CPU 201, various functions defined in the method and apparatus of the present disclosure are executed.

According to another aspect, the present disclosure further provides a computer-readable medium. The computer-readable medium may be included in the electronic device described in the foregoing embodiments, or may exist alone and is not assembled in the electronic device. The computer-readable medium carries one or more programs, the one or more programs, when executed by the electronic device, causing the electronic device to implement the method described in the following embodiments. For example, the electronic device may implement the steps shown in FIG. 3, FIG. 5, FIG. 6 and FIG. 8.

It should be noted that, the computer-readable medium according to the present disclosure may be a computer-readable signal medium or a computer-readable storage medium or any combination of the two media. The computer-readable storage medium may be, for example, but is not limited to, an electrical, magnetic, optical, electromagnetic, infrared, or semiconductor system, apparatus, or device, or any combination thereof. More specifically, the computer-readable storage medium may include, for example, but is not limited to, an electrical connection having one or more wires, a portable computer disk, a hard disk, a RAM, a ROM, an erasable programmable read-only memory (EPROM or flash memory), an optical fiber, a portable compact disc read-only memory (CD-ROM), an optical storage device, a magnetic storage device, or any suitable combination of the foregoing. In the present disclosure, the computer-readable storage medium may be any tangible medium containing or storing a program, and the program may be used by or used in combination with an instruction execution system, an apparatus, or a device. In the present disclosure, a computer-readable signal medium may include a data signal in a baseband or propagated as a part of a carrier wave, the data signal carrying a program code. A data signal propagated in such a way may assume a plurality of forms, including, but not limited to, an electro-magnetic signal, an optical signal, or any appropriate combination thereof. The computer-readable signal medium may be further any computer-readable medium in addition to a computer-readable storage medium. The computer-readable medium may send, propagate, or transmit a program that is used by or used in combination with an instruction execution system, apparatus, or device. The program code included in the computer-readable medium may be transmitted by using any suitable medium, including but not limited to, wireless transmission, a wire, a cable, radio frequency (RF) or the like, or any other suitable combination thereof.

The technical solution of the embodiments of the present disclosure is described in detail as follows:

When a special effect are added during the on-line live stream, it may enhance the overall effect and interactivity of the live stream, thereby improving user's live-streaming viewing experience. Taking an AR virtual live-streaming scene as an example, when a dancer performs on a stage, an AR special effect and the dancer may interact through positioning coordination. However, when the dancer is moving, the AR special effect cannot interact with the dancer in real time. In addition, in an existing special effect synthesis technology, reflective spots may be pasted on a body of the dancer in conjunction with a green screen, through the infrared recognition and the post-processing, to synthesize the special effect, which makes the entire process of the special effect synthesis relatively cumbersome. In addition, when a character channel and a scene channel are extracted through the green screen matting, a large green screen background cannot be placed on a real stage of a large-scale live stream, resulting in the inability to flexibly meet the requirement of the AR special effect synthesis in the large-scale live stream.

Based on the above one or a plurality of problems, the embodiment provides a method for generating live-streaming data, the method may be applied to the above server 105, and may also be applied to one or a plurality of the above terminal devices 101, 102, and 103 which is not specifically limited in the embodiment. As shown in FIG. 3, the method for generating the live-streaming data may include the following steps S310 to S340:

In step S310: a thermal imaging device is used to acquire current contour information of a live-streaming object:

In step S320: preset special effect data is bound with the current contour information of the live-streaming object, to generate target special effect data:

In step S330: a real-scene shooting image of the live-streaming object is synthesized with the target special effect data into a special effect frame image:

In step S340): a rendered multi-frame special effect frame image is converted into live-streaming stream data.

In the method for generating the live-streaming data provided in the embodiment of the present disclosure, the current contour information of the live-streaming object is acquired by using the thermal imaging device: the preset special effect data is bound with the current contour information of the live-streaming object to generate the target special effect data: the real-scene shooting image of the live-streaming object is synthesized with the target special effect data into the special effect frame image; and the rendered multi-frame special effect frame image is converted into the live-streaming stream data. On the one hand, a thermal imaging technology is utilized to acquire the contour information of the live-streaming object, which facilitates special effect rendering based on the contour information, simplifies the synthesis process of the live-streaming special effect, and enriches the application scenarios of the method: on the other hand, when the live-streaming special effect is synthesized based on the contour information of the live-streaming object, the effect of the real-time interaction between the live-streaming object and the live-streaming special effect may be achieved, which further enhances the display effect of the special effect during the live stream.

Next, the above steps of the embodiment are described in more detail.

In step S310, the thermal imaging device is used to acquire the current contour information of the live-streaming object.

In the embodiment of the present disclosure, the AR virtual live-streaming scene may be taken as an example for illustration. An AR is a technology that combines a real world and a virtual element, by using a variety of technical means such as a multimedia, a three-dimensional modeling, a real-time tracking, an intelligent interaction, and a sensing and the like, the virtual element such as a computer-generated text, an image, a 3D model, a music, a video and the like is simulated and then applied to the real world. The two types of information complement each other, so as to enhance the real world. For example, when the AR virtual live-streaming uses a dancer's performance as the live-streaming content, accordingly: the live-streaming object may be the dancer. It should be understood that the live-streaming object may be any target object for the special effect synthesis during the live stream, which is not specifically limited in the embodiment.

The live-streaming terminal may be a terminal device including a fixed camera, a display screen, and a terminal processor, such as a smart phone, a video camera with a processing module and the like. In the embodiment, in order to improve a live-streaming shooting effect, when the dancer performs for the AR virtual live stream, generally, the terminal device may use the video camera with the processing module. It should be noted that, in order to further facilitate the synthesis of the AR special effect, in the embodiment, when the dancer perform for the live stream, real-time shooting may be performed by the thermal imaging device. Specifically, a video camera device with a thermal imaging camera and a sensor may be prepared at the live-streaming site, the video camera device may not only acquire the real-scene shooting image of the dancer, but also acquire the contour information of the dancer. Referring to FIG. 4, FIG. 4A is a real-scene image, of a dancer performing on a stage at a certain moment, captured by the video camera device: FIG. 4B shows a contour image, of the dancer at this moment, captured by a thermal imaging camera in the video camera device.

As shown in FIG. 5, the current contour information of the live-streaming object may be acquired according to steps S510 to S530.

In step S510, temperature field information in a target region in a real live-streaming space is collected by using the thermal imaging device, where the temperature field information at least includes temperature data of the live-streaming object and temperature data of an environmental object.

In the embodiment, the thermal imaging device may be a thermal imaging video camera. The thermal imaging video camera may also be referred to as an infrared thermal imager, which is a sensor that may detect a tiny temperature difference, and since any object with a temperature emits an infrared ray, the infrared thermal imager may receive the infrared ray emitted by an object and display temperature distribution on a surface of the measured object through a colored picture. Temperature anomalies may be identified according to the tiny differences in the temperature, thus providing maintenance on an anomalous part.

During the dancer performs for the virtual live stream, the dancer may collect the temperature field information in a stage scene with a preset size by the thermal imaging video camera, and for example, the temperature field information within the field of view of the thermal imaging video camera may be collected. The temperature field refers to a field where a temperature exists, is a general term for the temperature distribution of each point in the object at each moment. For example, the collected temperature field information may include temperature-coordinate point data within the field of view of the thermal imaging video camera, such as may be represented as T=T (x, y, z), to reflect spatial distribution of the temperature. In addition, the collected temperature field information may include the temperature data of the live-streaming object and the temperature data of the environment object, as well as the coordinate point data of the live-streaming object and the environment object in the three-dimensional space. For example, the thermal imaging video camera may collect the temperature-coordinate point data of the dancer, and the thermal imaging video camera may also collect the temperature-coordinate point data of other objects within the field of view of the thermal imaging camera, such as props on the stage.

In step S520, when a difference value between the temperature data of the environmental object and a preset standard temperature is greater than a preset threshold value, a thermal image of the live-streaming object is generated according to the temperature data of the live-streaming object.

The temperature field data collected by the thermal imaging video camera may be sent to the processing module in the thermal imaging video camera. The processing module may read a preset standard human body temperature, which may be a temperature value such as 36° C., or a temperature range such as 36~37° C. According to the difference value between the temperature of other object in the stage scene and the standard human body temperature, the contour information of the dancer in the stage scene is extracted. For example, a threshold value of the temperature difference may be preset, such as 15° C. It should be noted that, the threshold value of the temperature difference may be set according to the actual requirement, which is not specifically limited in the embodiment. The temperature of the live-streaming object, i.e., the dancer, is about the standard human body temperature, assuming that the temperature of other object in the stage scene is 20° C., accordingly; the difference value between the temperature of other object in the stage scene and the standard human body temperature is greater than 15° C. According to the temperature data of the dancer, i.e., the temperature distribution of the dancer in the three-dimensional space, a corresponding color feature is set, for example, 36° ° C. may correspond to red. 37° ° C. may correspond to orange, so as to generate the thermal image corresponding to the temperature distribution.

In step S530, the current contour information of the live-streaming object is obtained by extracting the thermal image.

After obtaining the thermal image of the dancer, the current contour information of the dancer may be obtained by extracting contour line of the thermal image. It should be understood that, the current contour information may also include the temperature-coordinate point data of the dancer. If there is only one dancer in the current stage scene, there is only one corresponding human body contour information, which may be used to synthesize the AR special effect. Specifically, the processing module in the thermal imaging video camera may send the human body contour information to an UE (Unreal Engine) server in a live-streaming system through network transmission. The UE server is a real-time engine and editor with rendering function, dynamic physics and effect, animation, data conversion interface, and the like. Thus, the extracted human body contour information is sent to the UE server, and the AR special effect may be synthesized in the UE server. In other examples, by pasting reflective spots on the body of the dancer, and by performing the infrared recognition for each reflective spot, the human body contour information may be acquired, and the AR special effect synthesis may be performed in the UE server.

In an embodiment, when there are a plurality of live-streaming objects in a preset region, contour information of the plurality of live-streaming objects may be acquired; and when the contour information of the plurality of live-streaming objects overlaps, the contour information of the plurality of live-streaming objects may be separated, and contour information of an overlapping portion obtained by separation is reconstructed. For example, the video camera may also be a depth sensing camera, if there are a plurality of dancers in the current stage scene, accordingly, a plurality of human body contour information may be acquired, if the plurality of human body contour information overlap in the current scene, depth information of the dancer during the performance may be extracted by the depth sensing camera, then the human body contour of the dancer and the depth information of the human body contour may be extracted through gradient extraction, according to the depth information of the human body contour, the contour information of the plurality of dancer may be recognized and separated. For example, in the same viewing-angle region, if a distance between a dancer A and the depth sensing camera is 5 m, and a distance between a dancer B and the depth sensing camera is 6 m, the corresponding human body contours of the two dancers overlap with each other, a contour of the overlapping portion may be reconstructed and completed according to a standard human body contour model or mirror information, and the plurality of contour information after reconstruction may also be used to synthesize the corresponding AR special effect.

The method is applied to the live-streaming scene, when the contour information of the live-streaming object is acquired through thermal imaging, the character channel and scene channel may be separated, thus improving the accuracy of the interaction between the character and the AR special effect. Compared to the traditional manner of synthesizing the special effect through the green screen matting, the present method extracts the character channel through the temperature difference without setting up the large green screen, it is unnecessary for the dancer to wear the reflective spots for infrared recognition, and only the standard human body temperature needs to be preset to acquire the contour information for synthesizing the special effect, which simplifies the synthesis process of the live-streaming special effect, and may further meet the requirement of the AR special effect synthesis in the large-scale live stream, and enriches the application scenarios of the method. In addition, by by setting only one standard human body temperature, the plurality of dancers on the stage may be recognized at the same time, thereby increasing the stability of the live stream.

In step S320, the preset special effect data is bound with the current contour information of the live-streaming object, to generate the target special effect data.

After the UE server receives the current contour information of the dancer, the UE server may read a preset special effect binding and synthesis template in the UE server according to an AR special effect requirement of the current live stream. The preset special effect may preferably be a special effect in the form of three-dimensional display, and the reality experience may be enhanced through the three-dimensional special effect. Specifically, a specific special effect and its corresponding trigger event may be bound according to a template effect, to actively track and trigger the current contour information of the dancer.

In an embodiment, the preset special effect data may be produced by the UE server according to the template, and may include a continuously emitted particle effect, a collision effect, a preset interaction logic event, and the like. For example, the particle effect may an effect simulating water, fire, fog, gas, and the like in reality, for example, countless individual particles are combined to present a fixed form, and the overall or individual motion is controlled by a script to simulate a real effect: the collision effect may be a special effect, such as sparks, an explosion, destruction, and the like, generated by simulating the collision of various objects: the preset interaction logic event may be a corresponding special effect triggered when interacting with the live-streaming object, for example, after contour information of an anchor is acquired, a mouth part in the contour information of the anchor is recognized in the UE server, when an apple special effect is bound with the mouth part, the special effect event that a part of an apple is bitten off may be triggered.

As shown in FIG. 6, a special effect binding may be performed to generate the target special effect data according to steps S610 to S630.

In step S610, a key feature point is extracted in a standard contour model.

Taking the preset special effect data as a particle special effect as an example, in a particle special effect binding and synthesis template, the corresponding particle special effect may be generated according to posture of the dancer. In this template, since the effect of the particle special effect may change with the posture of the dancer, and a key part in the current contour information of the dancer, such as limbs and a head, changes correspondingly with the posture of the dancer. Thus, in order to bind the particle special effect with the current contour information of the dancer, first, the key feature point in the standard contour model may be extracted, such as coordinate data of the feature points corresponding to the limbs and the head in the standard contour model, so as to accurately recognize a key part in the current contour information of the dancer according to the coordinate data of these feature points.

It should be noted that, the key feature point in the standard contour model may be extracted by an existing tool and algorithm, such as OpenCV (Open Source Computer Vision Library), HOG (Histogram of Oriented Gradient), and the like. Sets of different key feature points correspond to different parts, and each key feature point corresponds to a unique coordinate value, indicating a position of the key feature point in the standard contour model.

In step S620, a first binding position corresponding to the key feature point in the current contour information of the live-streaming object is determined.

A part corresponding to a set of key feature points in the standard contour model corresponds to a key part of the dancer in the current contour information. For example, the particle special effect may be bound to the limbs and the head of the dancer in the current contour information, the key feature points belonging to "limbs and head" may be extracted and recognized from the standard contour model, according to a mapping relationship between positions of these key feature points in the standard contour model and the coordinate data of the dancer in the current contour information, corresponding contour feature points of the dancer in the current contour information may be determined, and the first binding position of the particle special effect and the current contour information of the dancer for special effect synthesis may be determined. The first binding position may be a set of the coordinate data of the contour feature points, or a region formed by lines connecting the contour feature points. For example, the first binding position may be a region formed by lines connecting outer contour feature points of the limbs and the head respectively.

In step S630, the target special effect data is obtained by binding the preset special effect data with the current contour information of the live-streaming object at the first binding position.

Figure 7:
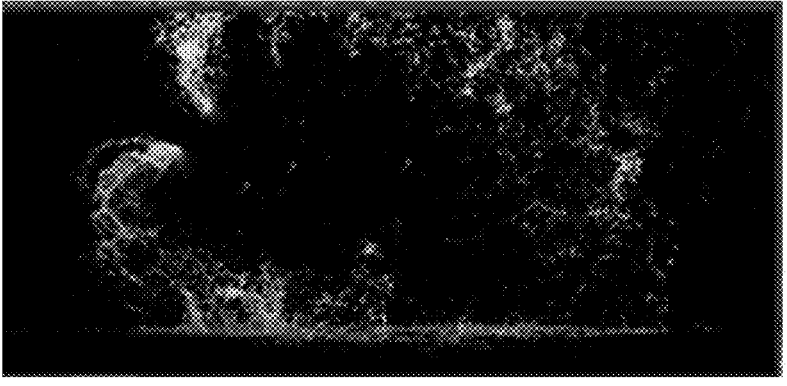
FIG. 7 schematically shows a schematic diagram in which target special effect data is a particle special effect according to an embodiment of the present disclosure.

The particle special effect that is continuously emitted outward may be bound at the outer contours of the limbs and the head of the dancer in the current contour information, the corresponding particle special effect may be triggered, and the particle special effect data corresponding to the current particle special effect is the target special effect data. As shown in FIG. 7, it schematically shows the particle special effect corresponding to the posture of the dancer at a certain moment. Compared to a traditional special effect 30) production manner, which is triggered by touching a specific preset range through passive collision, in the present method, actions of the dancer may affect and change the form of the particle special effect in real time, to achieve the purpose of enhancing the dancing effect.

Figure 8:
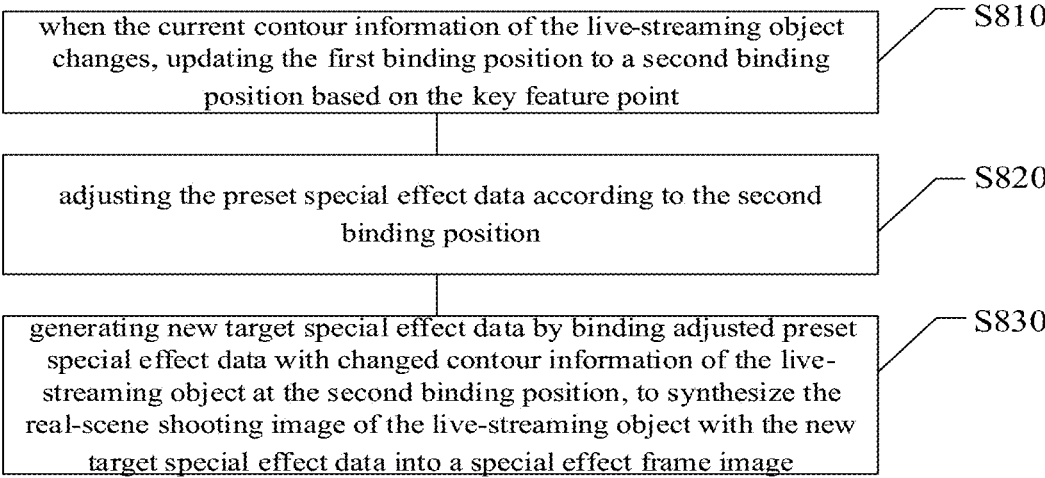
FIG. 8 schematically shows a flowchart for adjusting a special effect according to an embodiment of the present disclosure.

In an embodiment, referring to FIG. 8, the form and effect of the special effect may be adjusted according to steps S810 to S830.

In step S810, when the current contour information of the live-streaming object changes, the first binding position is updated to a second binding position based on the key feature point.

When the dancer performs, for example, from a jumping posture to a rotating posture, the contour information received by the UE may be changed from a contour A to a contour B, the coordinate data (i.e., the contour feature points), in the standard contour model, corresponding to the key feature points of the limbs and the head of the dancer in the contour information changes accordingly, and that is, the first binding position is updated to the second binding position. The first binding position is a set of coordinate data corresponding to the limbs and the head of the dancer in the contour A, where the contour A is obtained when the dancer is in a jumping posture: the second binding position is a set of coordinate data corresponding to the limbs and the head of the dancer in the contour B, where the contour B is obtained when the dancer is in a rotating posture. It should be noted that when the coordinate information of the contour feature points corresponding to the key limb parts used to bind the special effect in the contour information of the live-streaming object changes, the shape of the bound special effect changes accordingly, such that the effect that the form of the special effect may be changed in real time by the actions of the dancer, thereby enhancing the dancing effect of the dancer, and improving the user's live-streaming viewing experience.

In step S820, the preset special effect data is adjusted according to the second binding position.

When the second binding position is the set of coordinate data corresponding to the limbs and the head in contour B obtained when the dancer is in the rotating posture, the preset special effect data, such as the particle special effect, may be adjusted, to simulate an actual collision effect which binds the particle special effect in the rotating posture to the contour information.

In step S830, new target special effect data is generated by binding adjusted preset special effect data with changed contour information of the live-streaming object at the second binding position, to synthesize the real-scene shooting image of the live-streaming object with the new target special effect data into a special effect frame image.

At the second binding position, the contour B is bound with the particle special effect after form adjustment to generate the particle special effect of the dancer in the rotating posture, such that a dancer rotation image that is shot in real time and the corresponding particle special effect of the dancer in the rotating posture is synthesized into the special effect frame image.

In step S330, a real-scene shooting image of the live-streaming object is synthesized with the target special effect data into a special effect frame image.

Figure 9:
FIG. 9 schematically shows a special effect frame image according to an embodiment of the present disclosure.

The UE server may acquire the real-scene shooting image of the current frame of the live-streaming object according to a real-time image transmitted by a signal of the video camera. The target special effect data may be a special effect of a transparent channel, according to the mapping relationship between the real-scene shooting image of the live-streaming object and the contour information of the live-streaming object, the real-scene shooting image of the current frame of the live-streaming object is synthesized with the target special effect data to obtain the special effect frame image. As shown in FIG. 9, a special effect frame image of the dancer in the jumping posture corresponds to a synthetized effect of the particle special effect when the binding position is at the outer contour of the limbs and the rendering is not performed.

Figure 10:
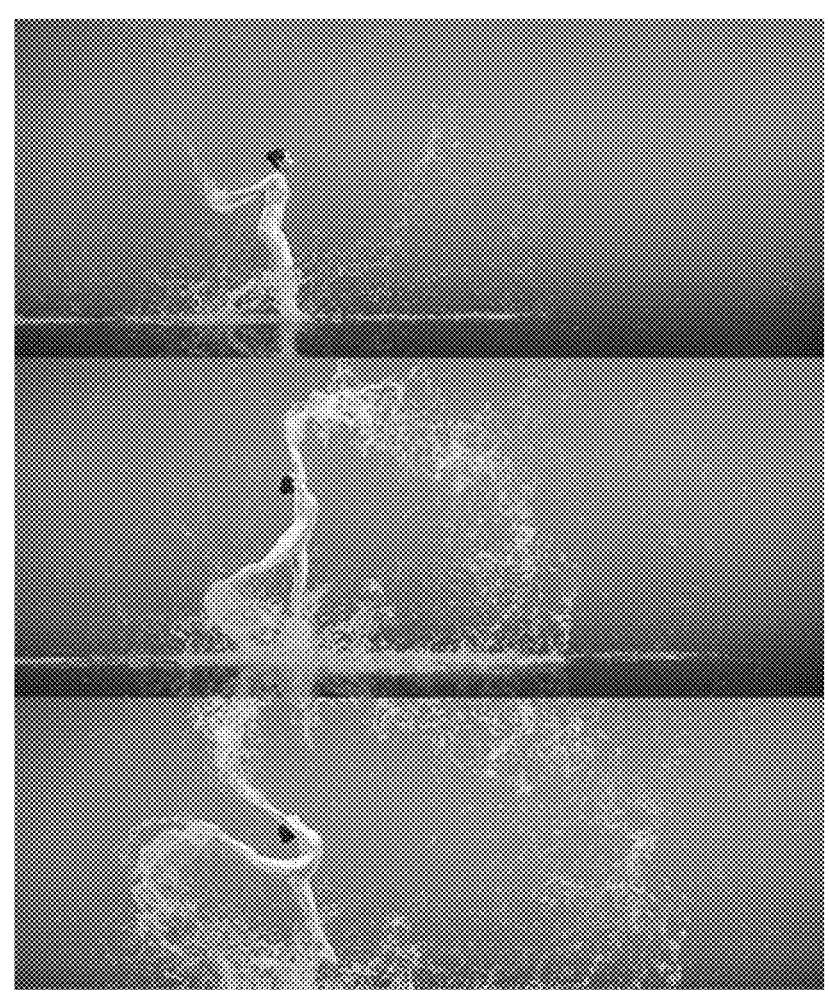
FIG. 10 schematically shows a diagram of a rendered special effect frame image according to an embodiment of the present disclosure.

In order to further improve reality enhancement effect of the particle special effect, the special effect frame image and the stage scene may be rendered correspondingly. For example, when the particle special effect is used to simulate an effect of water, the particle special effect may be rendered with PBR (Physically Based Rendering) according to a physical feature of material "water", and similarly, the stage scene may also be rendered. The PBR rendering is a rendering technology based on a micro-surface object, defines light reflection of an object surface through light calculation, the metallicity and roughness, which may well express a surface texture of the object. Due to its outstanding performance in simulating light reflection, the PBR rendering is often used in various high-level games and film and television productions. In other examples, other rendering methods may also be used to render the target special effect in the special effect frame image, such as a NPR (non-photographic rendering) shading model and the like. As shown in FIG. 10, there are rendered special effect frame images under three different postures of the dancer, such that the simulation effect of the particle special effect is more realistic, which enhances the visual effect of the user watching the virtual live stream, and improves the live-streaming interactive experience of the user.

In step S340, a rendered multi-frame special effect frame image is converted into live-streaming stream data.

The UE server may encode and encapsulate the rendered multi-frame special effect frame image and generate the live-streaming stream data in real time. For example, the multi-frame special effect frame image may be encoded and compressed into H.264/AVC (Advanced Video Coding, a high-efficiency video compression technology), H.265/HEVC (High Efficiency Video Coding) and other formats of data. The original data has a large storage space and consumes a large bandwidth for transmission, after H.264 coding and compression, redundant information of the image may be removed, thus meeting the requirement of the real-time transmission. Taking a H.264/AVC video compression standard as an example, it may be divided into a VCL (Video Coding Layer) and a NAL (Network Abstraction Layer), where the VCL is responsible for efficient video content representation and the NAL may package the live-streaming data into corresponding formats according to different networks, and adapt bit data generated by the VCL to various network environments. Finally, live-streaming video streams in formats such as MP4 (Multimedia Computer Archive Format), 3GP (Video Coding Format), AVI (Audio Video Interleaved) and other formats may be encapsulated through a container, where the container is a standard for mixing and encapsulating the encoded multimedia data, such as video, audio, subtitles and other information, and the container enables different multimedia data to be played synchronously, and may also provide an index for the multimedia data.

In an embodiment, after the UE server generates the live-streaming video stream in real time, it may also send the live-streaming video stream to a user-side live-streaming server, so as to forward the live-streaming video stream to a user client through the user-side live-streaming server. Specifically; the user-side live-streaming server may send the live-streaming video stream to the user client in a target live-streaming room according to an anchor client identifier, such as a live-streaming room ID (identification number) of the current AR virtual live stream and a user client identifier, such as a user ID, to finally complete the effect display of the AR special effect.

In the AR virtual live-streaming scene shown in this method, the dancer doesn't need to wear the special device and there is unnecessary to set the green screen for the stage to acquire the contour information of the dancer. The AR special effect is produced in the UE server according to the contour information, through the active tracking, and the AR special effect and the live-streaming real-time image are synthesized into the live-streaming stream, and the stream is pushed, so as to achieve the recognition, rendering and generation process of the AR special effect in the live stream, and enhance the interaction effect during the live stream.

In the method for generating the live-streaming data provided by the embodiment of the present disclosure, the current contour information of the live-streaming object is acquired by using the thermal imaging device: the preset special effect data is bound with the current contour information of the live-streaming object to generate the target special effect data: the real-scene shooting image of the live-streaming object is synthesized with the target special effect data into the special effect frame image; and the rendered multi-frame special effect frame image is converted into the live-streaming stream data. On the one hand, a thermal imaging technology is utilized to acquire the contour information of the live-streaming object, which facilitates the special effect rendering based on the contour information, simplifies the synthesis process of the live-streaming special effect, and enriches the application scenarios of the method: on the other hand, when the live-streaming special effect is synthesized based on the contour information of the live-streaming object, the effect of the real-time interaction between the live-streaming object and the live-streaming special effect may be achieved, which further enhances the display effect of the special effect during the live stream.

It should be noted that, although various steps of the methods in the present disclosure are described in a specific order in the accompanying drawings, this is not required or implied that the steps must be performed in this specific order, or a desired result may be realized must by performing all the steps shown. Additionally or alternatively, certain steps may be omitted, a plurality of steps may be combined into one step to execute, and/or one step may be decomposed into a plurality of steps to execute, and the like.

Figure 11:
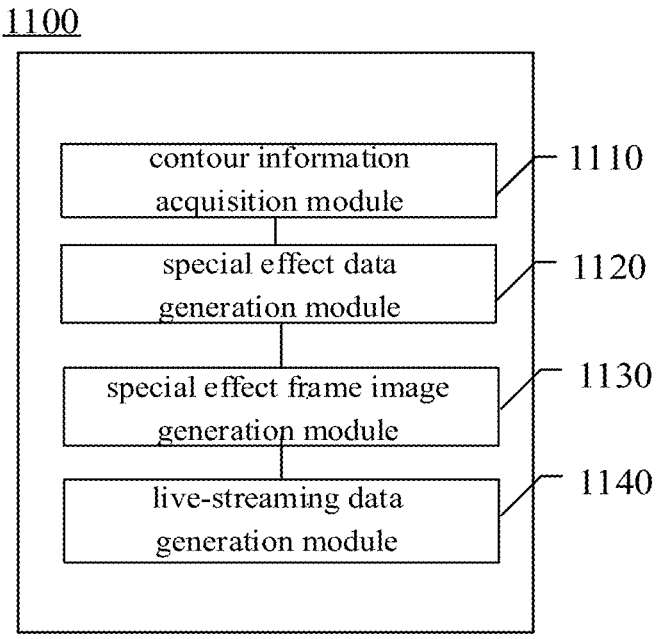
FIG. 11 schematically shows a block diagram of an apparatus for generating live-streaming data according to an embodiment of the present disclosure.

Further, in the embodiment, an apparatus for generating live-streaming data is also provided. The apparatus may be applied to a server or a terminal device. As shown in FIG. 11, the apparatus for generating the live-streaming data 1100 may include a contour information acquisition module 1110, a special effect data generation module 1120, a special effect frame image generation module 1130 and a live-streaming data generation module 1140, where:

a contour information acquisition module 1110 is configured to acquire current contour information of a live-streaming object by using a thermal imaging device;

a special effect data generation module 1120 is configured to generate target special effect data by binding preset special effect data with the current contour information of the live-streaming object;

a special effect frame image generation module 1130 is configured to synthesize a real-scene shooting image of the live-streaming object with the target special effect data into a special effect frame image; and a live-streaming data generation module 1140 is configured to convert a rendered multi-frame special effect frame image into live-streaming stream data.

In an embodiment, the contour information acquisition module 1110 includes:

a field information acquisition unit, configured to collect temperature field information in a target region in a real live-streaming space by using the thermal imaging device, where the temperature field information at least includes temperature data of the live-streaming object and temperature data of an environmental object;

a thermal image generation unit, configured to generate a thermal image of the live-streaming object according to the temperature data of the live-streaming object when a difference value between the temperature data of the environmental object and a preset standard temperature is greater than a preset threshold value; and a contour information acquisition unit, configured to obtain the current contour information of the live-streaming object by extracting the thermal image.

In an embodiment, the special effect data generation module 1120 includes:

a key point extraction unit, configured to extract a key feature point in a standard contour model;

a binding position determination unit, configured to determine a first binding position corresponding to the key feature point in the current contour information of the live-streaming object; and a special effect data generation unit, configured to obtain the target special effect data by binding the preset special effect data with the current contour information of the live-streaming object at the first binding position.

In an embodiment, the apparatus for generating the live-streaming data 1100 also includes:

a binding position update module, configured to update the first binding position to a second binding position based on the key feature point when the current contour information of the live-streaming object changes; and a special effect data adjustment module, configured to adjust the preset special effect data according to the second binding position;

generate new target special effect data by binding adjusted preset special effect data with changed contour information of the live-streaming object at the second binding position, to synthesize the real-scene shooting image of the live-streaming object with the new target special effect data into a special effect frame image.

In an embodiment, the special effect frame image generation module 1130 includes:

a real-scene shooting image acquisition unit, configured to acquire a real-scene shooting image of a current frame of the live-streaming object;

a special effect frame image synthesis unit, configured to synthesize the real-scene shooting image of the current frame with the target special effect data into the special effect frame image, and render the special effect frame image.

In an alternative embodiment, the live-streaming data generation module 1140 is configured to encode and encapsulate the rendered multi-frame special effect frame image into the live-streaming stream data.

In an embodiment, the apparatus for generating the live-streaming data 1100 also includes:

a live-streaming stream data forwarding module, configured to forward the live-streaming stream data to a user client through a user-side live-streaming server.

In an embodiment, the apparatus for generating the live-streaming data 1100 also includes:

a multi-contour information acquisition unit, configured to acquire contour information of the plurality of live-streaming objects when there are a plurality of live-streaming objects in a preset region;

a contour information separation unit, configured to separate the contour information of the plurality of live-streaming objects when the contour information of the plurality of live-streaming objects overlaps, and reconstruct contour information of an overlapping portion obtained by separation.

According to a first aspect of the present disclosure, a method for generating live-streaming data is provided and includes:

acquiring current contour information of a live-streaming object by using a thermal imaging device;

generating target special effect data by binding preset special effect data with the current contour information of the live-streaming object;

synthesizing a real-scene shooting image of the live-streaming object with the target special effect data into a special effect frame image; and converting a rendered multi-frame special effect frame image into live-streaming stream data.

In an embodiment of the present disclosure, acquiring the current contour information of the live-streaming object by using the thermal imaging device includes:

collecting temperature field information in a target region in a real live-streaming space by using the thermal imaging device, where the temperature field information at least includes temperature data of the live-streaming object and temperature data of an environmental object;

when a difference value between the temperature data of the environmental object and a preset standard temperature is greater than a preset threshold value, generating a thermal image of the live-streaming object according to the temperature data of the live-streaming object; and obtaining the current contour information of the live-streaming object by extracting the thermal image.

In an embodiment of the present disclosure, generating the target special effect data by binding the preset special effect data with the current contour information of the live-streaming object includes:

extracting a key feature point in a standard contour model;

determining a first binding position corresponding to the key feature point in the current contour information of the live-streaming object; and obtaining the target special effect data by binding the preset special effect data with the current contour information of the live-streaming object at the first binding position.

In an embodiment of the present disclosure, after generating the target special effect data, the method further includes:

when the current contour information of the live-streaming object changes, updating the first binding position to a second binding position based on the key feature point;

adjusting the preset special effect data according to the second binding position; and generating new target special effect data by binding adjusted preset special effect data with changed contour information of the live-streaming object at the second binding position, to synthesize the real-scene shooting image of the live-streaming object with the new target special effect data into a special effect frame image.

In an embodiment of the present disclosure, synthesizing the real-scene shooting image of the live-streaming object with the target special effect data into the special effect frame image includes:

acquiring a real-scene shooting image of a current frame of the live-streaming object; and synthesizing the real-scene shooting image of the current frame with the target special effect data into the special effect frame image, and rendering the special effect frame image.

In an embodiment of the present disclosure, converting the rendered multi-frame special effect frame image into the live-streaming stream data includes:

encoding and encapsulating the rendered multi-frame special effect frame image into the live-streaming stream data.

In an embodiment of the present disclosure, the method further includes:

forwarding the live-streaming stream data to a user client through a user-side live-streaming server.

In an embodiment of the present disclosure, the method further includes:

when there are a plurality of live-streaming objects in a preset region, acquiring contour information of the plurality of live-streaming objects; and when the contour information of the plurality of live-streaming objects overlaps, separating the contour information of the plurality of live-streaming objects, and reconstructing contour information of an overlapping portion obtained by separation.

According to a second aspect of the present disclosure, an apparatus for generating live-streaming data is provided and includes:

a contour information acquisition module, configured to acquire current contour information of a live-streaming object by using a thermal imaging device;

a special effect data generation module, configured to generate target special effect data by binding preset special effect data with the current contour information of the live-streaming object;

a special effect frame image generation module, configured to synthesize a real-scene shooting image of the live-streaming object with the target special effect data into a special effect frame image; and a live-streaming data generation module, configured to convert a rendered multi-frame special effect frame image into live-streaming stream data.

According to a third aspect of the present disclosure, a non-transitory computer-readable storage medium having a computer program stored thereon, where when performing the computer program, a processor is configured to implements the method according to any one of methods.

According to a fourth aspect of the present disclosure, an electronic device is provided and includes: a processor, and a memory, configured to store executable instructions of the processor, where when performing the executable instructions, the processor is configured to execute the method according to any one of methods.

The specific details of each module in the above apparatus for generating the live-streaming data have been described in detail in the corresponding method for generating live-streaming data, which is not repeated herein.

It should be noted that although several modules or units of the devices for action execution are described above, such division is not mandatory. In fact, according to the embodiments of the present disclosure, the features and functions of two or more modules or units described above may be embodied in one module or unit. Conversely, the features and functions of a module or unit described above can be further divided into multiple modules or units.

It should be understood that the present disclosure is not limited to the accurate structure that have been described and shown in the accompanying drawings, and various modifications and changes may be made without departing from the scope thereof. The scope of the present disclosure is limited only by the appended claims.

What is claimed is:

1. A method for generating live-streaming data, comprising:

acquiring current contour information of a live-streaming object by using a thermal imaging device;

generating target special effect data by binding preset special effect data with the current contour information of the live-streaming object;

synthesizing a real-scene shooting image of the live-streaming object with the target special effect data into a special effect frame image; and converting the special effect frame image into live-streaming stream data;

wherein generating the target special effect data by binding the preset special effect data with the current contour information of the live-streaming object comprises:

extracting a key feature point in a standard contour model;

determining a first binding position corresponding to the key feature point in the current contour information of the live-streaming object; and obtaining the target special effect data by binding the preset special effect data with the current contour information of the live-streaming object at the first binding position.

2. The method according to claim 1, wherein acquiring the current contour information of the live-streaming object by using the thermal imaging device comprises:

collecting temperature field information in a target region in a real live-streaming space by using the thermal imaging device, wherein the temperature field information comprises temperature data of the live-streaming object and temperature data of an environmental object;

in response to determining that a difference value between the temperature data of the environmental object and a preset standard temperature is greater than a preset threshold value, generating a thermal image of the live-streaming object according to the temperature data of the live-streaming object; and obtaining the current contour information of the live-streaming object by extracting the thermal image.

3. The method according to claim 1, further comprising:

in response to determining that the current contour information of the live-streaming object changes, updating the first binding position to a second binding position based on the key feature point;

adjusting the preset special effect data according to the second binding position; and generating new target special effect data by binding adjusted preset special effect data with changed contour information of the live-streaming object at the second binding position, and synthesizing the real-scene shooting image of the live-streaming object with the new target special effect data into a new special effect frame image.

4. The method according to claim 1, wherein synthesizing the real-scene shooting image of the live-streaming object with the target special effect data into the special effect frame image comprises:

acquiring a real-scene shooting image of a current frame of the live-streaming object; and synthesizing the real-scene shooting image of the current frame with the target special effect data into the special effect frame image, and rendering the special effect frame image.

5. The method according to claim 1, wherein converting the special effect frame image into the live-streaming stream data comprises:

encoding and encapsulating the special effect frame image into the live-streaming stream data.

6. The method according to claim 1, further comprising:

forwarding the live-streaming stream data to a user client through a user-side live-streaming server.

7. The method according to claim 1, further comprising:

in response to determining that there are a plurality of live-streaming objects in a preset region, acquiring contour information of the plurality of live-streaming objects; and in response to determining that the contour information of the plurality of live-streaming objects overlaps, separating the contour information of the plurality of live-streaming objects, and reconstructing contour information of an overlapping portion obtained by separation.

8. An electronic device, comprising:

a processor, and a memory, configured to store executable instructions of the processor, wherein when performing the executable instructions, the processor is configured to:

acquire current contour information of a live-streaming object by using a thermal imaging device;

generate target special effect data by binding preset special effect data with the current contour information of the live-streaming object;

synthesize a real-scene shooting image of the live-streaming object with the target special effect data into a special effect frame image; and convert the special effect frame image into live-streaming stream data;

wherein the processor is further configured to:

extract a key feature point in a standard contour model;

determine a first binding position corresponding to the key feature point in the current contour information of the live-streaming object; and obtain the target special effect data by binding the preset special effect data with the current contour information of the live-streaming object at the first binding position.

9. The electronic device according to claim 8, wherein the processor is configured to:

collect temperature field information in a target region in a real live-streaming space by using the thermal imaging device, wherein the temperature field information comprises temperature data of the live-streaming object and temperature data of an environmental object;

in response to determining that a difference value between the temperature data of the environmental object and a preset standard temperature is greater than a preset threshold value, generate a thermal image of the live-streaming object according to the temperature data of the live-streaming object; and obtain the current contour information of the live-streaming object by extracting the thermal image.

10. The electronic device according to claim 8, wherein the processor is configured to:

in response to determining that the current contour information of the live-streaming object changes, update the first binding position to a second binding position based on the key feature point;

adjust the preset special effect data according to the second binding position; and generate new target special effect data by binding adjusted preset special effect data with changed contour information of the live-streaming object at the second binding position, and synthesize the real-scene shooting image of the live-streaming object with the new target special effect data into a new special effect frame image.

11. The electronic device according to claim 8, wherein the processor is configured to:

acquire a real-scene shooting image of a current frame of the live-streaming object; and synthesize the real-scene shooting image of the current frame with the target special effect data into the special effect frame image, and render the special effect frame image.

12. The electronic device according to claim 8, wherein the processor is configured to:

encode and encapsulate the special effect frame image into the live-streaming stream data.

13. The electronic device according to claim 1, wherein the processor is configured to:

forward the live-streaming stream data to a user client through a user-side live-streaming server.

14. The electronic device according to claim 8, wherein the processor is configured to:

in response to determining that there are a plurality of live-streaming objects in a preset region, acquire contour information of the plurality of live-streaming objects; and in response to determining that the contour information of the plurality of live-streaming objects overlaps, separate the contour information of the plurality of live-streaming objects, and reconstruct contour information of an overlapping portion obtained by separation.

15. A non-transitory computer-readable storage medium having a computer program stored thereon, wherein when performing the computer program, a processor is configured to:

acquire current contour information of a live-streaming object by using a thermal imaging device;

generate target special effect data by binding preset special effect data with the current contour information of the live-streaming object;

synthesize a real-scene shooting image of the live-streaming object with the target special effect data into a special effect frame image; and convert the special effect frame image into live-streaming stream data;

wherein the processor is configured to:

extract a key feature point in a standard contour model;

determine a first binding position corresponding to the key feature point in the current contour information of the live-streaming object; and obtain the target special effect data by binding the preset special effect data with the current contour information of the live-streaming object at the first binding position.

16. The non-transitory computer-readable storage medium according to claim 15, wherein the processor is configured to:

collect temperature field information in a target region in a real live-streaming space by using the thermal imaging device, wherein the temperature field information comprises temperature data of the live-streaming object and temperature data of an environmental object;

in response to determining that a difference value between the temperature data of the environmental object and a preset standard temperature is greater than a preset threshold value, generate a thermal image of the live-streaming object according to the temperature data of the live-streaming object; and obtain the current contour information of the live-streaming object by extracting the thermal image.

17. The non-transitory computer-readable storage medium according to claim 15, wherein the processor is configured to:

in response to determining that the current contour information of the live-streaming object changes, update the first binding position to a second binding position based on the key feature point;

adjust the preset special effect data according to the second binding position; and generate new target special effect data by binding adjusted preset special effect data with changed contour information of the live-streaming object at the second binding position, and synthesize the real-scene shooting image of the live-streaming object with the new target special effect data into a new special effect frame image.

* * * * *